United States Patent [19]

Alewelt et al.

[11] Patent Number: 4,639,507

[45] Date of Patent: Jan. 27, 1987

[54] PROCESS FOR THE ISOLATION OF POLYARYLENE SULPHIDE

[75] Inventors: Wolfgang Alewelt, Krefeld; Wolfgang Eisermann, Duesseldorf; Karl-Heinrich Meyer; Erhard Tresper, both of Krefeld; Martin Ullrich, Leverkusen, all of Fed. Rep. of Germany

[73] Assignee: Bayer Aktiengesellschaft, Leverkusen, Fed. Rep. of Germany

[21] Appl. No.: 771,645

[22] Filed: Sep. 3, 1985

[30] Foreign Application Priority Data

Sep. 15, 1984 [DE] Fed. Rep. of Germany ....... 3433978

[51] Int. Cl.$^4$ .............................................. C08G 75/14
[52] U.S. Cl. .......................................... 528/388; 34/14; 264/344; 528/502; 528/503
[58] Field of Search ...................... 528/388, 502, 503; 34/14; 264/344

[56] References Cited

U.S. PATENT DOCUMENTS

| | | | |
|---|---|---|---|
| 3,451,462 | 6/1969 | Szabo et al. | 159/2 |
| 3,887,529 | 6/1975 | Rohlfing | 260/79 |
| 3,956,060 | 5/1976 | Scoggin | 159/47 R |
| 4,508,592 | 4/1985 | Kowalski | 159/2.1 |
| 4,532,310 | 7/1985 | Christensen et al. | 528/388 |

FOREIGN PATENT DOCUMENTS 0102536  3/1984  European Pat. Off. .

*Primary Examiner*—Harold D. Anderson
*Attorney, Agent, or Firm*—Connolly and Hutz

[57] ABSTRACT

The isolation of polyarylene sulphides by freeing polyarylene sulphides of the type obtained in customary production processes from adherent water and any other volatile constituents by treating the polyarylene sulphides in screw machines and optionally melting them either simultaneously or subsequently.

2 Claims, No Drawings

PROCESS FOR THE ISOLATION OF POLYARYLENE SULPHIDE

The invention relates to a process for the isolation of polyarylene sulphides with improved product properties.

Polyarylene sulphides and the production thereof are known.

The molecular weight of polyarylene sulphides can be increased by thermal treatment particularly in the presence of atmospheric oxygen. The products thus treated are branched (see for example U.S. Pat. No. 4,370,471 and U.S. Pat. No. 2,389,080). Compared with linear products they have poorer flow properties and reduced viscoplastic properties. In the thermal oxidative treatment partial over- or under-crosslinkage must be expected, with the result that the polymers become inhomogeneous and their properties non-uniform.

To isolate polyarylene sulphides the product is generally precipitated after the reaction and the impurities, above all the inorganic salts, are washed out with water. Then the polyarylene sulphide, which contains up to 500% by weight (based on the polymer) of water and/or other extracting agents, is dried at an elevated temperature, if appropriate in vacuo. In this process the product is subjected to heat over a relatively long period and is branched by oxidation under the influence of heat especially when atmospheric oxygen is not completely excluded.

It has now been found that polyarylene sulphides having considerably improved flow properties and improved mechanical properties are obtained when polyarylene sulphide of the type obtained in customary production processes is freed from adherent water and any other volatile constituents in less than an hour by being treated in screw machines and optionally melted either simultaneously or subsequently. This method can be used for treating polyarylene sulphides which may also already be branched and which have been produced by reacting (a) 50–100 mol % of dihalogen aromatic compounds of the formula

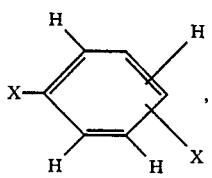

(I)

and 0–50 mol % of dihalogen aromatic compounds of the formula

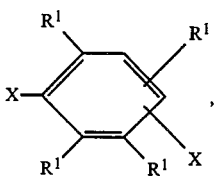

(II)

in which

X represents halogen, such as chlorine or bromine, which is in the meta or para position to the other halogen, and $R^1$ is identical or different and can be hydrogen, alkyl, cycloalkyl, aryl, alkylaryl or arylalkyl, wherein two radicals $R^1$ which are in the ortho position to each other can be linked to form an aromatic or heterocyclic ring and one radical $R^1$ is always different from hydrogen and (b) 0 to 5 mol %, preferably 0.05 to 2.5 mol %, based on the sum of the dihalogen aromatic compounds of the formula (I) and (II), of a tri- or tetrahalogen aromatic compound of the formula $$ArX_n \qquad (III)$$

wherein

Ar is an aromatic or heterocyclic radical,

X represents halogen such as chlorine or bromine and n represents the number 3 or 4 and (c) alkali metal sulphides, preferably sodium or potassium sulphide or mixtures thereof, preferably in the form of their hydrates or aqueous mixtures, optionally together with alkali metal hydroxides such as sodium and potassium hydroxide, the molar ratio of (a+b):c being in the range 0.85:1 to 1.15:1, preferably 0.95:1 to 1.05:1, in (d) organic solvents, preferably N-alkyl-lactams or peralkylated ureas, if appropriate using catalysts and/or co-solvents, the molar ratio of alkali metal sulphides (c) to the organic solvent (d) being in the range 1:2 to 1:15, and (e) water in the form of hydrate or free water, the molar ratio of c:e being in the range 1:0 to 1:3, at a reaction temperature of 160° C. to 270° C., if appropriate under excess pressure. The reaction mixture obtained can be introduced into a precipitant and the soluble impurities can be washed out of the precipitated polyarylene sulphide using water and/or other extracting agents.

This process is known. It can be modified in many ways, for example by using catalysts.

The product obtained can be coarsely/finely pulverulent or fibre- or plate-like or, if this proves to be advantageous, can be converted into another form before being processed further. It is also possible to suitably adjust the content of water or extracting agent at this point by means of known technological methods.

The polyarylene sulphides thus obtained are introduced continuously into a heated screw machine. The water and/or other extracting agents and other volatile constituents which are present or are formed are evaporated off in one or more evaporating domes, optionally in vacuo, the polyarylene sulphide is optionally melted, drawn off, optionally in the form of a strand, and granulated.

The content of water and/or extracting agent can be 5–400%, preferably 10–100%, based on polyarylene sulphide. The temperatures in the extruder are adjusted such that the water and/or extracting agent can evaporate and, in a preferred embodiment of the invention, such that the polyarylene sulphide is melted. Suitable temperatures are 50°–250° C., preferably 100°–200° C. if the polyarylene sulphide is not melted and 250°–350° C., preferably 270°–320° C. if the polyarylene sulphide is to be melted. Pressures of 1–600 mbar, preferably 1–300 mbar, are possible for the vacuum, it being possible to operate different domes with different vacua.

Suitable screw machines are, for example, customary single or twin shaft screws of the type known for the evaporation of solvents [see H. Herrmann, "Schneckenmaschinen in der Verfahrenstechnik" (Screw machines in process technology) Springer Verlag, 1972]. Discontinuously operating machines, for example kneaders, are also suitable.

The short time necessary for the working up and drying steps are an essential advantage of the process according to the invention. Whereas according to known methods up to 30 hours were necessary just for the drying step this time can be greatly reduced according to the invention. Times of less than one hour, preferably 1 to 5 minutes, are required for the drying step according to the invention.

Additives which favourably influence the subsequent properties of the polyarylene sulphide, such as stabilisers, modifiers, pigments, fillers and reinforcing agents can be incorporated in the polyarylene sulphide melt, optionally in one operating step.

THE PRODUCTION OF A POLYPHENYLENE SULPHIDE [ACCORDING TO DE-OS (GERMAN OFFENLEGUNGSSCHRIFT) NO. 3,339,233]

1.290 g of sodium sulphide trihydrate (=10.0 mols of Na$_2$S), 204.1 g of sodium acetate trihydrate (15 mol %, based on Na$_2$S) and 4,000 ml of N-methylpyrrolidone are initially introduced into an autoclave fitted with a stirrer and a distillation head and heated to 200° C. A liquid distils off which mainly consists of water.

Then 1.470 g of 1,4-dichlorobenzene, dissolved in 500 ml of N-methylpyrrolidone, are added and the reaction mixture is heated to 240° C. and left at this temperature for 5 h.

When the reaction has ended the reaction mixture is introduced into isopropanol while stirring vigorously. The product precipitated in a fibre-like to pulverulent form is washed four times with four times the amount of precipitant and then, in order to remove residual amounts of inorganic salts, washed with water until free from electrolytes.

EXAMPLE 1 (COMPARISON)

A polyphenylene sulphide produced according to the above directions and having a water content of 100%, based on the polyphenylene sulphide, is dried in a disk dryer under nitrogen at different temperatures and different residence times. The result are listed in the table.

EXAMPLE 2

Polyphenylene sulphide of the same type as in Example 1 is introduced, in a quantity of 18 kg/h of moist product, into a twin shaft screw of type ZSK 32, from the Werner and Pfleiderer company, which screw has shafts rotating in the same direction and two heating zones and two evaporating domes. The first section of the screw, up to the first evaporating dome, is heated at 150° C. and the second section, including the second evaporating dome, at 280° C. The average residence time in the extruder is 2 mins. The ratio between the quantities distilled off from the 1st and 2nd evaporating domes is 2:1. The melted polyphenylene sulphide is drawn off in the form of a strand at 9 kg/h and granulated. The results are in the table.

EXAMPLE 3

Example 2 is repeated, the second section with the second evaporating dome being heated to 190° C. The ratio between the quantities distilled off from the 1st and 2nd evaporating domes off is 2:1. Th polyphenylene sulphide is however obtained in a pulverulent form in a quantity of 9 kg/h. The results are in the table.

EXAMPLE 4

Example 2 is repeated, a vacuum of 100 mbar being applied in the second evaporating dome. The results are in the table.

After incorporating 50% of glass fibres, of type 8041, from the Silenka company, into the polyphenylene sulphides obtained the impact strengths were measured. The results are listed in the table.

TABLE

| Example | Drying conditions Dryer/temperature | Drying time | Melt viscosity (Pas) measured in a rotating viscometer at 306° C. | Impact strength (KJ/m$^2$) |
|---|---|---|---|---|
| 1 | Disk dryer/80° C. | 24 h | 100 | 29 |
|   | Disk dryer/140° C. | 14 h | 140 | 25 |
|   | Disk dryer/200° C. | 4 h | 240 | 16 |
| 2 | ZSK 32/Zone 1 150° C./ Zone 2 280° C. | 2 mins. | 90 | 32 |
| 3 | ZSK 32/Zone 1 150° C./ Zone 2 190° C. | 2 mins. | 90 | 30 |
| 4 | ZSK 32/Zone 1 150° C./ Zone 2 280° C. at 100 mbar | 2 mins. | 95 | 34 |

We claim:

1. A process for the isolation of polyarylene sulphide from a crude reaction mixture which comprises removing water and other volatile materials by evaporation in a heated screw machine in less than one hour.

2. A process as claimed in claim 1 wherein the polyarylene sulphide is melted simultaneously with said evaporation or subsequent to said evaporation.